(12) United States Patent
Bauerle (10) Patent No.: US 10,703,075 B2
(45) Date of Patent: Jul. 7, 2020

(54) VEHICLE WINDSHIELD FOR HEAD-UP DISPLAY, VEHICLE INCORPORATING IT AND MANUFACTURE

(71) Applicant: SAINT-GOBAIN GLASS FRANCE, Courbevoie (FR)

(72) Inventor: Pascal Bauerle, Roye (FR)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 0 days.

(21) Appl. No.: 16/304,463

(22) PCT Filed: May 17, 2017

(86) PCT No.: PCT/FR2017/051194
§ 371 (c)(1),
(2) Date: Nov. 26, 2018

(87) PCT Pub. No.: WO2017/203133
PCT Pub. Date: Nov. 30, 2017

(65) Prior Publication Data
US 2019/0291388 A1    Sep. 26, 2019

(30) Foreign Application Priority Data

May 26, 2016    (FR) ...................................... 16 54743

(51) Int. Cl.
*B32B 17/06*    (2006.01)
*B60Q 3/14*    (2017.01)
(Continued)

(52) U.S. Cl.
CPC .. *B32B 17/10541* (2013.01); *B32B 17/10036* (2013.01); *B32B 17/10174* (2013.01);
(Continued)

(58) Field of Classification Search
CPC ........ B32B 17/10293; B32B 17/10541; B32B 17/10761; B60Q 3/51; B60Q 3/205
(Continued)

(56) References Cited

U.S. PATENT DOCUMENTS

| | | | | | |
|---|---|---|---|---|---|
| 4,943,140 | A | * | 7/1990 | Woodard | B32B 17/10174 359/585 |
| 5,270,518 | A | * | 12/1993 | Naoumenko | B32B 17/10036 219/203 |
| 7,520,416 | B2 | * | 4/2009 | Crumbach | B23K 1/0008 219/203 |
| 2006/0174476 | A1 | * | 8/2006 | Loibl | B32B 17/10036 29/611 |

(Continued)

FOREIGN PATENT DOCUMENTS

DE    10 2011 112717 A1    3/2013
EP    0 420 228 A2    4/1991
(Continued)

OTHER PUBLICATIONS

International Search Report as issued in International Patent Application No. PCT/FR2017/051194, dated Aug. 3, 2017.

*Primary Examiner* — Evan P Dzierzynski
*Assistant Examiner* — Keith G. Delahoussaye
(74) *Attorney, Agent, or Firm* — Pillsbury Winthrop Shaw Pittman LLP (57) ABSTRACT

A laminated vehicle windshield for head-up display, includes a first glazing, forming an exterior glazing, a lamination interlayer made of polymeric material, the lamination interlayer having a cross section which decreases in wedge shape from the top toward the bottom of the laminated glazing, a second glazing, forming an interior glazing, the second main face and the third main face being the internal faces of the laminated glazing, a set of diodes, each diode emitting in the direction of the interior glass. For each of the diodes, the lamination interlayer includes a blind aperture housing the diode.

20 Claims, 9 Drawing Sheets

(51) Int. Cl.
*B60Q 3/20* (2017.01)
*B32B 17/10* (2006.01)
*F21S 43/14* (2018.01)
*F21S 43/19* (2018.01)
*B32B 37/18* (2006.01)
*B32B 38/00* (2006.01)
*B60K 35/00* (2006.01)
*G09F 9/33* (2006.01)
*B60J 1/02* (2006.01)
*G02B 27/01* (2006.01)

(52) U.S. Cl.
CPC .. *B32B 17/10293* (2013.01); *B32B 17/10568* (2013.01); *B32B 17/10761* (2013.01); *B32B 37/182* (2013.01); *B32B 38/0004* (2013.01); *B60K 35/00* (2013.01); *F21S 43/14* (2018.01); *F21S 43/19* (2018.01); *G09F 9/33* (2013.01); *B32B 2605/00* (2013.01); *B60J 1/02* (2013.01); *B60K 2370/1529* (2019.05); *G02B 27/0101* (2013.01); *G02B 2027/0196* (2013.01)

(58) Field of Classification Search
USPC .......................................................... 362/503
See application file for complete search history.

(56) References Cited

U.S. PATENT DOCUMENTS

| | | | | |
|---|---|---|---|---|
| 2006/0275599 | A1* | 12/2006 | Lefevre | B32B 17/10018 428/332 |
| 2007/0148472 | A1* | 6/2007 | Masaki | B32B 17/10036 428/426 |
| 2008/0176043 | A1* | 7/2008 | Masaki | B32B 17/10036 428/172 |
| 2010/0227135 | A1* | 9/2010 | Takagi | B32B 17/10018 428/215 |
| 2015/0093539 | A1* | 4/2015 | Krugmann | B32B 17/10036 428/99 |
| 2015/0151675 | A1* | 6/2015 | Lefevre | B32B 17/10 362/520 |
| 2017/0274630 | A1* | 9/2017 | Oota | B32B 27/18 |
| 2019/0134952 | A1* | 5/2019 | Varanasi | B32B 17/10036 |

FOREIGN PATENT DOCUMENTS

| | | |
|---|---|---|
| EP | 0 844 075 A1 | 5/1998 |
| WO | WO 2004/009349 A1 | 1/2004 |
| WO | WO 2004/062908 A2 | 7/2004 |
| WO | WO 2007/077466 A2 | 7/2007 |
| WO | WO 2013/093351 A1 | 6/2013 |
| WO | WO 2015/041106 A1 | 3/2015 |

\* cited by examiner

VEHICLE WINDSHIELD FOR HEAD-UP DISPLAY, VEHICLE INCORPORATING IT AND MANUFACTURE

CROSS-REFERENCE TO RELATED APPLICATIONS

This application is the U.S. National Stage of PCT/FR2017/051194, filed May 17, 2017, which in turn claims priority to French patent application number 1654743 filed May 26, 2016. The content of these applications are incorporated herein by reference in their entireties.

FIELD

The invention relates to a vehicle windshield for head-up display and also to a vehicle comprising such a windshield and to the manufacture of such a windshield.

BACKGROUND

Head-up display (HUD) systems are of use in all types of vehicles, in particular automotive vehicles.

Head-up display systems display information projected onto a laminated glazing, which is reflected toward the driver or the observer. These systems make it possible in particular to give information to the driver of the vehicle without the driver looking away from the field of view forward of the vehicle, in order to guarantee that the driving is safe. The driver then perceives a virtual image which is located at a certain distance behind the windshield.

If a conventional laminated glazing is used for such a system, the driver observes a double image: a first image reflected by the surface of the windshield directed toward the inside of the passenger compartment and a second image reflected by the exterior surface of the windshield, these two images being slightly offset with respect to each other. This offsetting can disturb the viewing of the information. In order to overcome this problem, use may be made of a laminated windshield formed of two glass sheets and of an interlayer made of polyvinyl butyral (PVB), the two exterior faces of which are not parallel but wedge-shaped, so that the image projected by a display source and reflected by the face of the windshield directed toward the passenger compartment is virtually superimposed on the same image originating from the same source reflected by the face of the windshield oriented toward the outside. In order to produce this wedge-shaped laminated glazing, use is made of an interlayer sheet, the thickness which decreases from the upper edge of the glazing to the lower edge.

SUMMARY

The invention relates to a vehicle windshield for head-up display capable of incorporating one or other luminous signaling without damaging the head-up display.

To this end, a first subject matter of the present patent application is a vehicle laminated windshield for head-up display, in particular automotive vehicle or even public transport vehicle, comprising:
a laminated glazing comprising:
a first glazing, made of optionally clear, extra-clear or tinted, in particular gray or green, and preferably bent mineral glass, forming an exterior glazing, with first and second main faces respectively called face F1 and face F2, if automotive vehicle of thickness E of preferably at most 2.5 mm and even of at most 2 mm—in particular 1.9 mm, 1.8 mm, 1.6 mm and 1.4 mm—or even of at most 1.3 mm or at most 1 mm,
an optionally clear, extra-clear or tinted, in particular gray or green, lamination interlayer made of preferably thermoplastic polymeric material and better still made of polyvinyl butyral (PVB), preferably, if automotive vehicle, of thickness e1 of at most 1.8 mm, better still of at most 1.2 mm and even of at most 0.9 mm (and better still of at least 0.3 mm and even of at least 0.6 mm), in particular set back from the edge face of the first glazing by at most 2 mm and set back from the edge face of a second glazing by at most 2 mm, the lamination interlayer having a cross section which decreases in wedge shape from the top toward the bottom of the laminated glazing,
a second glazing, made of preferably bent and preferably clear or extra-clear or indeed even tinted mineral glass, forming an interior glazing, with third and fourth main faces respectively face F3 and face F4, if automotive vehicle of thickness preferably less than than that of the first glazing, even of at most 2 mm—in particular 1.9 mm, 1.8 mm, 1.6 mm and 1.4 mm—or even of at most 1.3 mm or of at most 1 mm, the total thickness of the first and second glazings preferably being strictly less than 4 mm and even than 3.7 mm,
the face F2 and the face F3 being the internal faces of the laminated glazing,
between the face F2 and the face F3, one or more inorganic light-emitting diodes, each diode having an emitting face capable of emitting, in the direction of the face F3, a signaling light, and each diode having an edge face, each diode being of submillimetric thickness e2 and even of at least 0.2 mm,
and, according to the invention, for each of the diodes, the lamination interlayer (a first sheet) comprises a blind aperture surrounding the edge face of the diode, and in particular the lamination interlayer is in the "interdiode" space between neighboring diodes which are in separate apertures, and/or, for a group of diodes, the lamination interlayer comprises a "common" aperture which is blind surrounding said group of diodes.

Moreover, an aspect of the invention relates to a first process for the manufacture of the laminated windshield already described, which comprises the following stages:
automatic cutting out of a first sheet of lamination interlayer of unvarying thickness, preferably of at most 0.9 mm, in order to form one or more local apertures, preferably through apertures, in particular in the bottom region of the windshield,
provision of a second sheet, preferably a PVB sheet, having a cross section decreasing in wedge shape from the top toward the bottom of the laminated glazing, which second sheet is preferably closer to the face F3 and in contact with the first sheet,
assembling the laminated glazing, in particular with through apertures which are wider than the size of the diodes, preferably wider by at most 0.5 mm or even by at most 0.1 mm.

Finally, an aspect of the invention relates to a second process for the manufacture of the laminated windshield already described, which comprises the following stages:
automatic cutting out of a first interlayer sheet having a cross section which decreases in wedge shape from the top toward the bottom of the laminated glazing, preferably of at most 0.9 mm and greater than e2, in order to form one or more local blind apertures, in particular in the top region of the windshield, assembling the laminated glazing, in particular with apertures which are wider than the size of the diodes, preferably wider by at most 0.5 mm or even by at most 0.1 mm.

BRIEF DESCRIPTION OF THE DRAWINGS

The present invention is now explained in greater detail with reference to the appended figures, in which:

FIG. 1' shows another windshield of an automotive vehicle on a road, the windshield being provided with the luminous signaling according to the invention.

DETAILED DESCRIPTION

Cutting out completely all around the PCB carrier, as practised in the prior art, increases the risk of poor assembly (bubbles, delamination, esthetic defects). Thus, the present invention provides local cut-outs of the lamination interlayer which are dedicated to the diodes.

The lamination interlayer is preferably at the closest to the diodes and preferably, taking into account the tolerance of positioning of the diodes during cutting out, is preferably chosen to be wider than the width of the diodes (even if the interlayer is flexible).

In a preferred embodiment, the remaining thickness Hf between Fw and the bottom of the blind aperture preferably is at least 0.1 mm and even 0.2 mm and at most 0.5 mm and even at most 0.3 mm and preferably the front surface of the diode is in contact with the bottom delimiting the blind aperture or spaced out by at most 0.2 mm or by at most 0.1 mm.

In a preferred embodiment, use is made of a conventional PVB sheet with preferably traversing apertures (simpler to make) and another wedge PVB or also a PVB/plastic film/PVB composite sheet with preferably blind apertures in order not to pierce the plastic film and/or the electrically conductive layer which it carries (solar control, and the like). The electrically conductive layer is entire—thus distant from the blind aperture or apertures—indeed even the plastic film is entire and thus distant from the blind aperture or apertures.

The wedge PVB has changing thicknesses and, according to the location of the holes for the diodes in this interlayer, there is a risk of having either an excess thickness of the LEDs with regard to this PVB, leading to a local pressure of the LEDs on the glass which can result in breakage, or a major excess thickness of the PVB with respect to the LEDs, which amounts to trapping air, which can cause quality problems subsequently. The interface between the PVBs may possibly be discernible.

In another embodiment, use is made of a single wedge PVB sheet (PVB alone—mono- or multilayer—or multisheets which is preassembled with blind apertures).

In a preferred embodiment, the lamination interlayer (the walls of the apertures) is spaced out by at most 0.5 mm, better still by at most 0.2 mm, indeed even 0.1 mm, from the edge face of the diodes and even is in contact with the edge face of the diodes. In the case of a blind aperture, then the aperture can be filled with the diode (or the group of diodes).

In a preferred embodiment, e1 is subcentimetric, preferably between 0.5 and 0.9 mm (in particular 0.76 mm for conventional PVB and, for example, 0.81 mm for acoustic PVB). The lamination interlayer can be an acoustic PVB.

Preferably, the blind aperture is in an optionally acoustic PVB, or also in a composite (preassembled) PVB/plastic film (functional) or PVB/plastic film (functional)/PVB element, the plastic film, preferably a PET, being alone (colored, tinted) or being an element (transparent, colorless, and the like) carrying a functional layer, in particular an electrically conductive layer (solar control and the like).

The functional plastic film, with or without electrically conductive layer, can preferably cover the surface of the laminated glazing. The functional plastic film alone can, for example, be (intentionally) tinted or colored. The plastic film with the electrically conductive layer can be transparent and colorless.

The functional plastic film is preferably of thickness of at most 0.2 mm and even of at most 0.1 mm, again of at most 0.05 mm.

The electrically conductive layer preferably remains intact (for esthetic purposes, in order to avoid hot spots, and the like) and even the plastic film, such as PET, remains intact, without blind or through hole —thus without a portion of said blind aperture-.

A diode can be of the chip-on-board type or even very preferably a surface mount device (SMD) then comprising a peripheral package.

In a preferred embodiment, each diode, preferably power diode, is an electronic component including at least one semiconductor chip and is equipped with a polymeric or ceramic peripheral package encapsulating the edge face of the electronic component (and defining the edge face of the diode), surrounding the semiconductor chip.

The package can correspond to the maximum thickness (height) e2 of the diode. The package is, for example, made of epoxy. A polymeric package can optionally shrink (the final thickness after lamination can be less than the initial thickness) during the lamination. The (polymeric) package can be opaque.

The package (which is monolithic or made of two segments) can comprise a part forming a support carrying the chip and a part forming a reflector which widens with distance from the support higher than the reflector, and containing a protective resin and/or a material having a color conversion function. The front surface can be defined as the surface of this material covering the chip, this surface being set back from or level with the "front" surface of the reflector.

The diode can comprise a protective resin or a material having a color conversion function, even just on the semiconductor chip. The semiconductor chip can be embedded in a material (resin, and the like).

The (chip-on-board or SMD) diode can be devoid of optical element (above the semiconductor chip (which is or is not embedded in the material) in order to facilitate compactness.

Preferably, the diodes are surface mount devices mounted on the front face of a diode carrier which is in particular flexible, for example a PCB board, the diodes even having a Lambertian or quasi-Lambertian emission pattern.

The diode carrier (PCB board) can be sufficiently flexible (soft) to adapt to the curves of the bent laminated glazing.

The diode carrier which is in particular flexible can protrude from the edge face of the glazing. This makes it easier to supply electricity: for example, it is not necessary to add an electrical supply within the laminated glazing (flat cable, wires, electrically conductive layers on the faces F2 or F3 of the glazings, and the like). The (flexible) diode carrier can be local, for example cover less than 10% of the surface of the laminated glazing, in particular in a peripheral region of the laminated glazing (of the windshield). The (flexible) diode carrier can otherwise cover more than 10% and even the surface of the laminated glazing.

In a preferred embodiment, the lamination interlayer is made of PVB with e1 ranging from 0.5 to 0.9 mm, and the diodes are surface mount devices mounted preferably on the front face (F3 face side) of a flexible diode carrier, such as a PCB board, of thickness e'2 preferably of at most 0.2 mm and even of at most 0.15 mm. The diode carrier which is in particular flexible can protrude from the edge face of the glazing.

The width of the PCB board is preferably at most 5 cm, better still at most 2 cm and even at most 1 cm. The width (or length) of a diode with a single semiconductor chip, generally a square-shaped diode, is preferably at most 5 mm. The length of a diode with a plurality of semiconductor chips (typically surrounded by the package), generally of rectangular shape, is preferably at most 20 mm, better still at most 10 mm.

The diode or diodes are surface mount devices mounted preferably on a "front" face of a flexible diode carrier which is bonded or stuck by its back face against the face F2, in particular bonding by an adhesive (glue or preferably double-sided adhesive tape), of thickness e3 with $e3 \leq 0.1$ mm, better still $e3 \leq 0.05$ mm —even such that e3+e'2 is at most 0.15 mm, better still at most 0.1 mm-. With this adhesive, $e3+et2 \leq e1$ is preferred (above all if present on the back face of the PCB in the zone of the diodes).

The bonding is over the entire length or discrete, in zones containing and/or not containing diodes.

Otherwise, the diode or diodes are, for example, surface mount devices mounted preferably on a "front" face of a flexible diode carrier and a lamination interlayer (PVB, of conventional thickness, tinted and/or acoustic) is also between the back face of the flexible diode carrier and the face F2.

Especially, the diode or diodes are in the bottom part of the windshield outside the head-up display zone, in particular more at the periphery of the head-up display zone.

The diode or diodes are surface mount devices mounted preferably on a front face of a flexible diode carrier (or on the face F2 with an electrically conductive layer —tracks and not-), and the diode or diodes are positioned in a region of the windshield in which the exterior glass is rendered opaque by an opaque layer in particular made of enamel, preferably in F2, and/or in which the interior glass is rendered opaque by an opaque layer in particular made of enamel, preferably in F4, and then comprising at least one gap in line with the diodes.

In particular, the luminous signaling by the diode or diodes is an anticollision means and/or the or one of the diodes is a luminous indicator of a touch on/off switch (of an electrically controllable device between the face F2 and F3: OLED, light valve or SPD, film-type or wire-type heating element, screen), preferably capacitive, between F2 and F3 or on the face F4.

The diodes are, if necessary, power diodes which in operation are undersupplied electrically with current, preferably with a factor of at least 10 and even of at least 20 (thus intensity/10, indeed even intensity/20), in particular so as to maintain a temperature of less than the softening point of the polymeric material of the lamination interlayer, in particular of at most 130° C., better still of at most 120° C. and even of at most 100° C.

These diodes guarantee an excellent efficiency without excessively heating.

For example, for diodes supplied with current at 1 A, between 50 and 100 mA is chosen.

The inorganic diodes are, for example, based on gallium phosphide, gallium nitride or aluminum gallium nitride.

The diode carrier (PCB board) can be sufficiently flexible (soft) to adapt to the curves of the bent laminated glazing.

In one embodiment, the diode carrier comprises a film made of plastic which is preferably transparent (if necessary), preferably made of polyethylene terephthalate or PET or made of polyimide, provided with preferably transparent conductive tracks, which are in particular metal (copper, and the like) or made of transparent conductive oxide, and equipped with surface mount diodes. The conductive tracks are printed or deposited by any other deposition method, for example physical vapor deposition. The conductive tracks can also be wires. It is preferable for the conductive tracks and the film to be transparent when they are visible, that is to say when they are not masked by a masking element (layer) (such as an enamel, indeed even a paint, and the like), in particular on face F4 or F3. The conductive tracks can be transparent due to the transparent material or due to their width, sufficiently thin to be (virtually) invisible. The tracks, which may or may not be visible, can be made of copper, for example insulated by lines (removal of material by laser etching, and the like).

Polyimide films have a better resistance to higher temperatures in comparison with the alternative PET or even PEN (polyethylene naphthalate).

Preferably, the diode carrier, alone or in combination with a flat connector, extends at least as far as the edge face of the laminated glazing and preferably protrudes from the edge face, for example is dogleg-shaped, better still L-shaped, and, between the back face of the diode carrier and the face F2, there is housed an adhesive, leaktight to liquid water, of thickness of at most 0.1 mm and better still of at most 0.05 mm, in particular a double-sided adhesive tape. Such an adhesive is preferred to an overmolding solution. It can be the preferably transparent adhesive used to fix the (entire) PCB board.

The diode carrier can comprise a first part (rectangular or round) carrying one or more diodes and a second part for the connections (rectangular, less broad) emerging and even protruding over the edge face of the laminated glazing. This second part can be (much) longer than the first part.

The diode carrier can be combined with a flat connector which extends as far as the edge face of the glazing and even protrudes beyond it. A flexible connector which adapts to the curves of the glazing, comprising a plastic, for example PEN or polyimide, is preferred. The flat connector can have a width (dimension along the edge face) which is less than or equal to the dimension of the (diode) carrier, in particular along the edge face.

The glazing can comprise several groups of diodes (and thus of blind apertures) with the same function or separate functions.

In order to obtain a greater luminous surface and/or different colors, it is possible to have, on one and the same PCB board, several rows of diodes or even to place side-by-side two PCB boards (at least to place side-by-side the zones of the PCBs with diodes).

On a given diode carrier, the diodes can emit the same light or light of different colors, preferably not at the same time.

Conventionally, the diodes are in (at least) one row forming a luminous strip along a longitudinal or lateral edge of the windshield.

Conventionally, the diodes are in (at least) one row forming a luminous strip along:
  a longitudinal edge of the windshield (in particular driver-side); the diode carrier can protrude from an edge face of a lateral edge and even from the other lateral edge or also and/with a connecting part protruding from the edge face of the longitudinal edge—
  or a lateral edge of the windshield (in particular driver-side); the diode carrier can protrude from an edge face of a longitudinal edge and even from the other longitudinal edge and/or also with a connecting part protruding from the edge face of the lateral edge.

Naturally, the lamination interlayer can be in direct contact with the face F3 (respectively F2) or with a conventional functional coating on this face, in particular a stack of thin layers (including one or more silver layers), such as: a heating layer, antennae, a solar control or low-e layer or a decorative or (opaque) masking layer, such as a generally black enamel.

The diode carrier can be in the clear glass area, spaced out or not spaced out from the opaque edges (enamelled frame in general). For example, the PCB board is placed along a lateral or longitudinal edge or again more centrally, in particular substantially halfway from the lateral edges, and even closer to the lower longitudinal edge (in the mounted position) than to the upper longitudinal edge. Most often, there is an opaque layer on face F2 and an opaque layer on face F4, indeed even F3. Their widths are identical or distinct.

The diode carrier can be arranged in or in the vicinity of the region of an opaque layer, in particular a (black) enamel, along a peripheral edge of the laminated glazing, generally on face F2 and/or face F4 or also on face F2 and/or on face F3.

In this first embodiment, the diodes, indeed even the entire diode carrier, may be visible only from the interior, in order to display information—such as a warning (anticollisions) to a driver or even to any other person—without limiting the view of the driver through the windshield.

The PCB board can be positioned in a region of the windshield in which the interior glass is rendered opaque by an opaque layer (the innermost), such as a (black) enamel, preferably on F4, indeed even on F3. This opaque layer then comprises at least apertures (by masking on deposition or by removal, in particular with a laser) in line with the diodes. This opaque layer, for example, is in the form of a set of geometrical or nongeometrical (round, rectangular, square, and the like) opaque patterns which are identical or different in size (having an increasingly small size and/or with patterns which are increasingly spaced out on moving away from the edge face). Zones between the opaque patterns are in line with the diodes. In these zones, a scattering layer, such as a white enamel, can be added on face F4, indeed even on F3. The scattering layer can be spaced apart from or contiguous with this (innermost) opaque layer. Preferably, the windshield additionally comprises the opaque layer on face F2.

In particular, the diodes can be arranged in order to form one or more letters, a symbol (triangle, fault or hazard symbol, and the like), one or more arrows (left and right indicators), using one or more PCB boards. It is possible to have as many PCB boards and sets of diodes as described above as necessary. For example:
  a first set along a left-hand lateral edge, preferably closer to the bottom longitudinal edge than to the top longitudinal edge,
  a second set along a right-hand lateral edge, preferably closer to the bottom longitudinal edge than to the top longitudinal edge,
  a third set along the bottom longitudinal edge, preferably on the driver side,
  a fourth set at the center, preferably closer to the bottom longitudinal edge than to the top longitudinal edge.

It is possible to change in color depending on the safety level or also to turn on more or fewer diodes depending on the safety level.

Of course, the invention relates to any vehicle comprising a windshield with luminous signaling which is an (open road (highway) or even urban) anticollision means, in particular preventing collisions by detection of a distance to the automobile (or any other means of locomotion, such as a motorbike, bicycle, scooter, and the like, or also an animal) in front (or an object or a person, such as a pedestrian) which is too short, or also by detection of an excessively short distance of an object or a person or an automobile or any other means of locomotion (bicycle, motorbike, and the like) on the left-hand or right-hand side of the automobile, and turning on the preferably red or, more gradually, orange (amber) then red diodes, or even diodes with three or more levels and thus colors.

Mention may be made, as diodes, of the Oslon Black Flat range sold by Osram. For red light, mention may be made, as diode sold by Osram, of: Oslon Black Flat Lx H9PP. For orange (amber) light, mention may be made, as diode sold by Osram, of: LCY H9PP. For white light, mention may be made, as diode sold by Osram, of: LUW H9QP or KW HxL531.TE, where x=is the number of chips in the diode (for example 4 or 5).

Mention may be made, as flexible PCB, of the Akaflex® range of products (in particular PCL FW) from Krempel.

In one embodiment of the vehicle, it comprises at least one control unit for managing the diodes and even at least one sensor, in particular for detecting dangerous situations. A control unit for managing the diodes can be in the laminated glazing, on or outside the PCB board.

Finally, the invention relates to a first process for the manufacture of the laminated windshield already described, which comprises the following stages:
  automatic cutting out of a first sheet of lamination interlayer of unvarying thickness, preferably of at most 0.9 mm, in order to form one or more local apertures, preferably through apertures, in particular in the bottom region of the windshield,
  provision of a second sheet, preferably a PVB sheet, having a cross section decreasing in wedge shape from the top toward the bottom of the laminated glazing, which second sheet is preferably closer to the face F3 and in contact with the first sheet, assembling the laminated glazing, in particular with through apertures which are wider than the size of the diodes, preferably wider by at most 0.5 mm or even by at most 0.1 mm.

Preferably:

before the assembling, the diode or diodes are in through apertures and are in particular thicker than the first sheet by at most 0.2 mm or even by at most 0.1 mm or set back in the aperture by at most 0.5 mm and even by at most 0.3 mm or 0.2 mm.

Finally, the invention relates to a second process for the manufacture of the laminated windshield already described, which comprises the following stages:

automatic cutting out of a first interlayer sheet having a cross section which decreases in wedge shape from the top toward the bottom of the laminated glazing, preferably of at most 0.9 mm and greater than e2, in order to form one or more local blind apertures, in particular in the top region of the windshield, assembling the laminated glazing, in particular with apertures which are wider than the size of the diodes, preferably wider by at most 0.5 mm or even by at most 0.1 mm.

Preferably, for the first or the second process:

the diode or diodes (4) are surface mount devices mounted preferably on a "front" face, F3 face side, of a flexible diode carrier, with the front face against the first sheet, the first sheet, preferably PVB, is optionally acoustic and/or tinted or preassembled PVB/plastic film, in particular of thickness of at most 0.2 mm and even of at most 0.1 mm or of at most 0.05 mm, such as functional PET (with or without electrically conductive layer, in particular solar control layer), or PVB/plastic film, in particular of thickness of at most 0.2 mm and even of at most 0.1 mm or of at most 0.05 mm, such as functional PET (with or without electrically conductive layer)/PVB; the optional second sheet is clear or extra-clear.

The lamination interlayer, for its part, can be made of polyvinyl butyral (PVB), or of polyurethane (PU), of ethylene/vinyl acetate (EVA) copolymer, formed from one or more films, for example having a thickness between 0.2 mm and 1.1 mm.

An acoustic interlayer can comprise at least one "central" layer made of viscoelastic plastic with vibro-acoustic damping properties, in particular based on polyvinyl butyral (PVB) and plasticizer, and furthermore comprising two external layers made of standard PVB, the central layer being between the two external layers.

Optionally, one or both external layers has a cross section which decreases in wedge shape from the top toward the bottom of the laminated glazing, the layer made of a viscoelastic plastic with vibro-acoustic damping properties having an unvarying cross section from the top toward the bottom of the laminated glazing. Mention may be made, as example of an acoustic sheet, of Patent EP 0 844 075.

The diodes can be placed on the front face manually or automatically (higher precision).

The diode carrier can be positioned with respect to the glazing (F2 face side back face) and constrain the placement of the holed lamination interlayer, the lamination interlayer preferably being cut with excess over the outline of the glazing (the excess being cut off after the glazing has been fitted front face side), or also the diode carrier with the diodes can be positioned with respect to the holed lamination interlayer and is constrained by the placement of the latter, the lamination interlayer preferably being cut to the exact shape of the laminated glazing.

In order to limit heating in the passenger compartment or to limit the use of air conditioning, one of the glazings at least (preferably the exterior glass) is tinted, and the laminated glazing can also comprise a layer which reflects or absorbs solar radiation, preferably on face F4 or on face F2 or F3, in particular a transparent electrically conductive oxide layer, a "TCO layer", (on face F4) or even a stack of thin layers comprising at least one TCO layer, or stacks of thin layers comprising at least one silver layer (on F2 or F3), the or each silver layer being positioned between dielectric layers.

It is possible to simultaneously have a (silver-containing) layer on face F2 and/or F3 and a TCO layer on face F4.

The TCO layer (of a transparent electrically conductive oxide) is preferably a layer of fluorine-doped tin oxide ($SnO_2$:F) or a layer of mixed indium tin oxide (ITO).

Other layers are possible, including thin layers based on mixed indium zinc oxides (referred to as "IZOs"), based on gallium-doped or aluminum-doped zinc oxide, based on niobium-doped titanium oxide, based on cadmium or zinc stannate, or based on antimony-doped tin oxide. In the case of aluminum-doped zinc oxide, the doping level (that is to say, the weight of aluminum oxide with respect to the total weight) is preferably less than 3%. In the case of gallium, the doping level can be higher, typically within a range extending from 5 to 6%.

In the case of ITO, the atomic percentage of Sn is preferably within a range extending from 5 to 70% and in particular from 10 to 60%. For layers based on fluorine-doped tin oxide, the atomic percentage of fluorine is preferably at most 5% and generally from 1 to 2%.

ITO is particularly preferred, especially with respect to $SnO_2$:F. Of higher electrical conductivity, its thickness can be smaller to obtain one and the same emissivity level. Easily deposited by a cathode sputtering process, in particular a magnetron cathode sputtering process, these layers are characterized by a lower roughness and thus a lower tendency to foul.

One of the advantages of fluorine-doped tin oxide is, on the other hand, its ease of deposition by chemical vapor deposition (CVD), which, contrary to the cathode sputtering process, does not require a subsequent heat treatment and can be implemented on the float flat glass production line.

The term "emissivity" is understood to mean the normal emissivity at 283 K within the meaning of the standard EN12898. The thickness of the low-emissivity (TCO, and the like) layer is adjusted, depending on the nature of the layer, so as to obtain the desired emissivity, which depends on the sought-for thermal performance. The emissivity of the low-emissivity layer is, for example, less than or equal to 0.3, in particular less than or equal to 0.25 or even less than or equal to 0.2. For layers made of ITO, the thickness will generally be at least 40 nm, indeed even at least 50 nm and even at least 70 nm, and often at most 150 nm or at most 200 nm. For layers made of fluorine-doped tin oxide, the thickness will generally be at least 120 nm, indeed even at least 200 nm, and often at most 500 nm.

For example, the low-emissivity layer comprises the following sequence:

high-index underlayer/low-index underlayer/a TCO layer/optional dielectric overlayer. It is possible to choose, as preferred example of low-emissivity layer (protected during a tempering), high-index underlayer (<40 nm)/low-index underlayer (<30 nm)/an ITO layer/high-index overlayer (5-15 nm)/low-index barrier overlayer (<90 nm)/final layer (<10 nm).

Mention may be made, as low-emissivity layer, of those described in the patent US2015/0146286, on the face F4, in particular in examples 1 to 3.

In a preferred embodiment:
the first and/or the second glazing is tinted,
and/or one of the faces F1 or F2 or F3 or F4—preferably the face F4—of the laminated glazing is coated with a low-emissivity layer, in particular comprising a transparent electrically conductive oxide layer ("TCO layer"), in particular a stack of thin layers with a TCO layer or a stack of thin layers with silver layer(s),
and/or the lamination interlayer is tinted in all or some of its thickness (in particular away from the side of the surface most exposed to light, often the surface where degradation occurs),
and/or an additional tinted (polymeric, such as a polyethylene terephthalate PET, and the like) film is between the faces F2 and F3 or (bonded) on F4, indeed even on face F1.

In particular, the face F4 of the laminated glazing is coated with a transparent functional layer, in particular a low-emissivity layer, preferably comprising a TCO layer, including a zone (supplied with electricity and thus an electrode) forming a touch button (for controling the first luminous surface).

Figure 1:
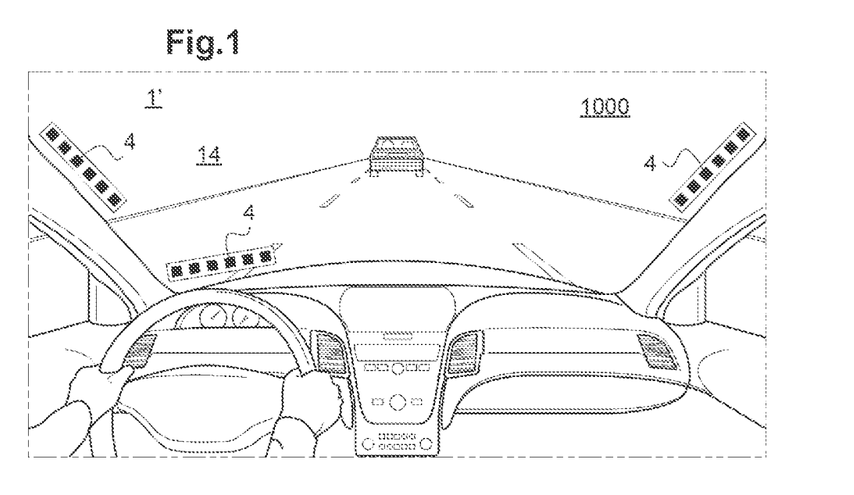
FIG. 1 shows a windshield of an automotive vehicle on a road, the windshield being provided with the luminous signaling according to the invention.

FIG. 1 shows (as seen from inside the vehicle) a windshield 1000 of an automotive vehicle moving along a three-lane road with an automobile in front.

The windshield is a laminated glazing with luminous signaling according to the invention:
using a first set of six diodes 4 on a first printed circuit board, "PCB board", incorporated between the two glazings of the laminated glazing, which diodes in a row are positioned in the clear glass area in an edge zone of the windshield along the lower longitudinal edge, optionally in or in the vicinity of a peripheral masking zone (opaque enamel, and the like) of the exterior glazing (not represented) or even in a zone with an alternation of masking zone (opaque layer, such as an opaque enamel) and transparent zone (facing a diode) of the exterior and/or interior glazing,
using a second set of six diodes 4 on a second printed circuit board, "PCB board", incorporated between the two glazings of the laminated glazing, which diodes in a row are positioned in the clear glass area in an edge zone of the windshield along the (left-hand) lateral edge, in particular driver side, optionally in or in the vicinity of a peripheral masking zone (opaque enamel, and the like) of the exterior glazing or even in a zone with an alternation of masking zone (opaque layer, such as an opaque enamel) and transparent zone (facing a diode) of the exterior and/or interior glazing,
using a third set of six diodes 4 on a third printed circuit board, "PCB board", incorporated between the two glazings of the laminated glazing, which diodes in a row are positioned in the clear glass area in an edge zone of the windshield along the right-hand lateral edge, in particular passenger side, optionally in or in the vicinity of a peripheral masking zone (opaque enamel, and the like) of the exterior glazing or even in a zone with an alternation of masking zone (opaque layer, such as an opaque enamel) and transparent zone (facing a diode) of the exterior and/or interior glazing.

These diodes, in particular of the first set, can emit red light, alerting the driver when the automobile in front (or any other means of locomotion or also an animal) is detected as too close. The red light can be continuous or flashing. The light chosen to be continuous can increase in intensity as the automobile in front gets closer or from a preset distance, the "high-risk distance". The frequency of light chosen to be flashing can increase as the automobile in front gets closer or from a preset distance, the "high-risk distance".

When the automobile in front is sufficiently far away (observation of the safe distance), the diodes are turned off.

These diodes, in particular of the second set, can emit red light, alerting the driver when an automobile (or any other means of locomotion or also an animal) is detected as too close on the left-hand side of the automobile. The red light can be continuous or flashing. The light chosen to be continuous can increase in intensity as the automobile on the side gets closer or from a preset distance, the "high-risk distance". The frequency of light chosen to be flashing can increase as the automobile on the side gets closer or from a preset distance, the "high-risk distance". When the automobile on the side is sufficiently far away (observation of the safe distance), the diodes are turned off.

These diodes, in particular of the third set, can emit red light, alerting the driver when an automobile (or any other means of locomotion or also an animal) is detected as too close on the right-hand side of the automobile. The red light can be continuous or flashing. The light chosen to be continuous can increase in intensity as the automobile on the side gets closer or from a preset distance, the "high-risk distance". The frequency of light chosen to be flashing can increase as the automobile on the side gets closer or from a preset distance, the "high-risk distance". When the automobile on the side is sufficiently far away (observation of the safe distance), the diodes are turned off.

The anticollision system operates on any road: highway, urban. It can also serve to warn of the excessively close presence of an object or pedestrian.

The signaling light can also change from one color (for example orange or amber) when the vehicle is at a risky distance to another color, for example red, when the vehicle is at a shorter and even more dangerous distance.

In these cases, as many diodes as necessary are provided, for example one row with an alternation of red diodes and orange diodes, or one row per color. It is also possible to have at least three signaling levels (three colors).

The vehicle incorporates at least one sensor (preferably one per set of diodes) in order to detect these dangerous situations (nonobservation of the safe distance, or others) and at least one control unit for managing the diodes.

The diodes are not necessarily in a row, in particular parallel to the edge of the glazing.

The PCB board or boards with diodes are preferably in the driver side lower quadrant. Being in the clear glass area, a transparent PCB board is preferred.

Figure 1A:
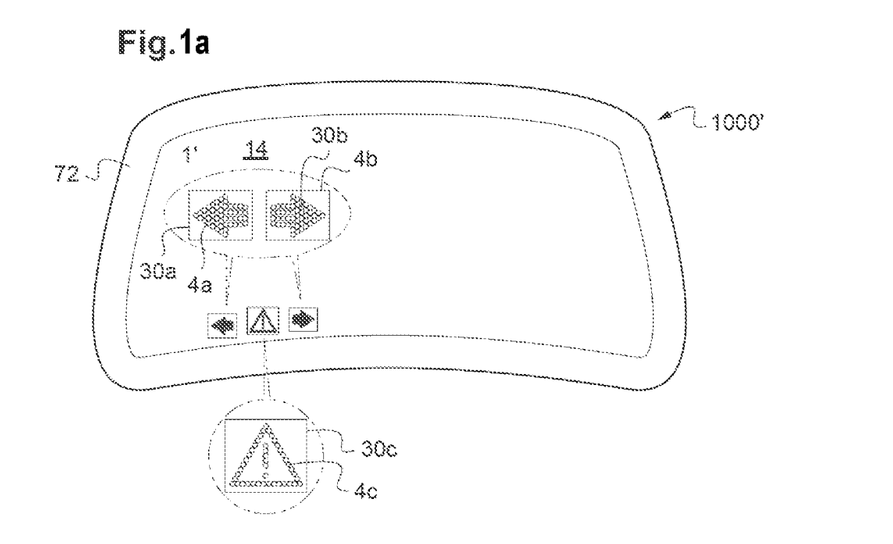
FIG. 1a shows another windshield of an automotive vehicle on a road, which windshield is provided with the luminous signaling according to the invention.

FIG. 1a shows another windshield of an automotive vehicle, windshield 1000', with luminous signaling according to the invention. It differs from that of FIG. 1 in the type of signaling and in the location of the second and third PCB boards.

The first set of diodes 4c, on a carrier 30C, forms a triangle with, if possible, a central exclamation mark. It thus forms a danger signal.

The second and third sets of diodes 4a and 4b, on their carriers 30a and 30b, form arrows showing that the indicator is engaged.

In order to combine with an HUD function, the lamination interlayer additionally exhibits a cross section which decreases in wedge shape from the top toward the bottom of the laminated glazing.

Figure 1B:
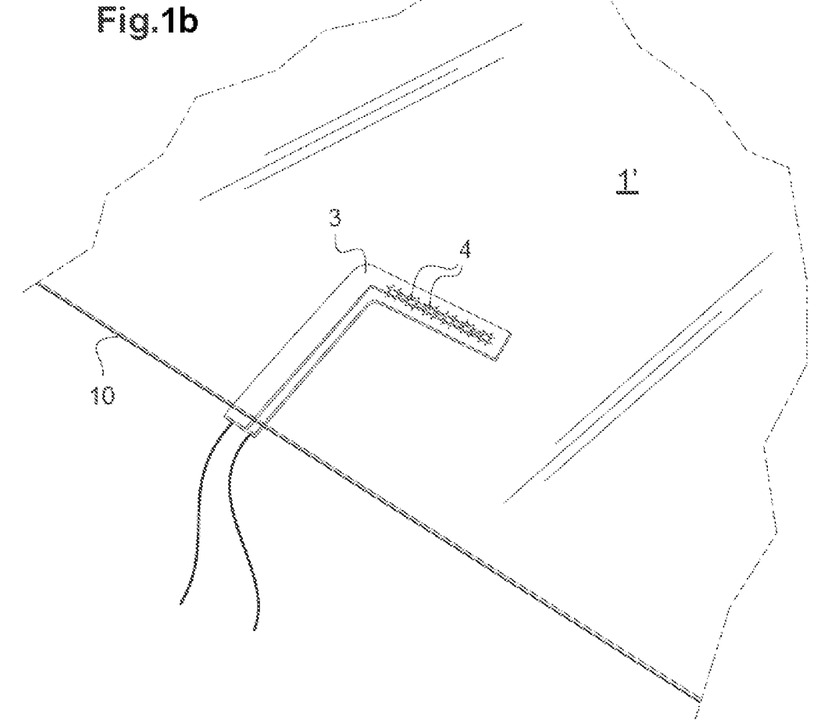
FIG. 1b shows an example of a PCB board with the diodes.

FIG. 1b is a diagrammatic view of an L-shaped PCB board 3 with diodes 4 visible through the glass 1' and a connecting part of the PCB board exiting from the edge face 10 of the laminated glazing. The PCB board can be transparent (polyimide film, for example, with transparent tracks) or opaque, for example with copper tracks isolated by laser etching (and masked except for luminous points).

FIG. 1' shows another windshield of an automotive vehicle on a road, the windshield being provided with the luminous signaling according to the invention. It differs from that of FIG. 1 in the more peripheral location of the three PCB boards, which can be opaque (opaque carrier and/or opaque conductive tracks (wires, and the like), for example made of copper). The face F2 comprises an entire masking frame 72, preferably made of black enamel, and the face F4 14 (or F3) comprises a masking frame, preferably made of black enamel, with apertures in line with the diodes 4.

Figure 2:
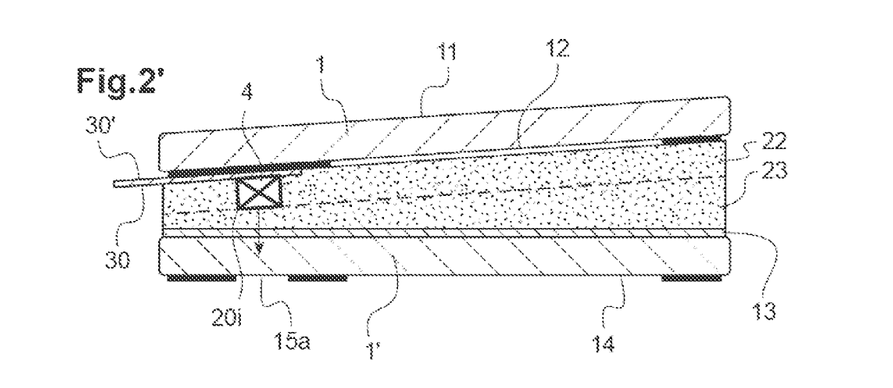
FIG. 2 is a diagrammatic cross-sectional view of a luminous-signaling windshield in a first embodiment of the invention, as are FIGS. 2a, 2b, 2', 3a, 3b, 4a, 4b, 5a, 5b, 6a, 6'a, and 6b.

FIG. 2 is a diagrammatic cross-sectional view of a luminous-signaling and head-up display windshield in a first detailed embodiment of the invention, comprising a bent laminated glazing, comprising:

a first glazing 1, for example made of TSA glass and with a thickness of 2.1 mm, forming the exterior glazing, which is preferably tinted, with first and second main faces 11, 12 respectively called face F1 and face F2, and an edge face 10, a lamination interlayer 20 made of polymeric material, in this instance made of PVB, which is preferably clear, of submillimetric thickness, preferably exhibiting a cross section which decreases in wedge shape from the top toward the bottom of the laminated glazing, for example a PVB (RC41 from Solutia or Eastman) with a thickness of approximately 0.76 mm, or, in an alternative form, if necessary, an acoustic PVB (three-layer or four-layer), for example with a thickness of approximately 0.81 mm, for example an interlayer made of 3 PVB sheets 21, 22, 23, a second glazing 1', forming the interior glazing, for example made of TSA (or clear or extra-clear) glass and with a thickness of 2.1 mm or even of 1.6 mm or even less, with third and fourth main faces 13, 14 respectively called face F3 and face F4, the face F4 optionally being coated with a functional layer (low-emissivity layer, and the like), the face F2 and the face F3 being the internal faces 11, 11' of the laminated glazing, a set of inorganic light-emitting diodes 4, which are surface mount devices (SMDs), for example emitting in the red, mounted on a printed circuit board, "PCB board", 3, the PCB board+diodes assembly being of total thickness e2+e'2 e1 and better still with a difference of at most 0.5 mm and preferably of 0.1 mm to 0.2 mm, the diodes being of thickness e2 and the PCB board 3 of thickness e'2, with a "front" face 30 facing the face F3 and a back face 30' against the face F2, each diode having an emitting face emitting in the direction of the interior glazing 1'.

For each of the diodes, the wedge lamination interlayer made of PVB has a region 22 which comprises a blind aperture 20i housing the diode (surrounding the edge face of the diode and in this instance in contact with the edge face) and even the wall bottom forming the aperture being able to be in contact with the diode 4.

The lamination interlayer 20 is present in the laminated glazing between the face F3 and the front face of the PCB board 3 over the entirety of the front face of the PCB, diodes excepted. The lamination interlayer 20 is also present between the face F2 and the back face 30'.

The diodes (with a single semiconductor chip here) are square in shape with a width of the order of 5 mm or less.

A PCB board which is as thin as possible, flexible and even preferably as unobtrusive as possible (minimum width or even transparency), for example comprising a transparent film, such as a PET, a PEN or a polyimide, and even, for the printed circuit, transparent connection tracks (rather than tracks made of copper, unless they are made sufficiently thin), is chosen. The PCB board protrudes from the edge face 10.

The windshield comprises a frame 15 made of black enamel on face F2 and a frame 15' made of black enamel on face F4.

Figure 2A:
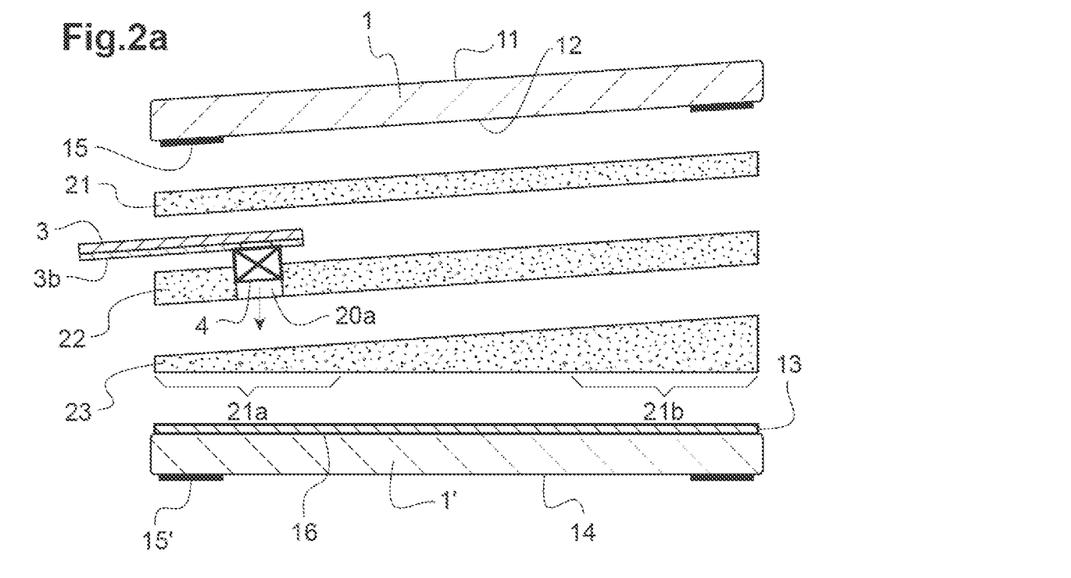
Figure 2B:
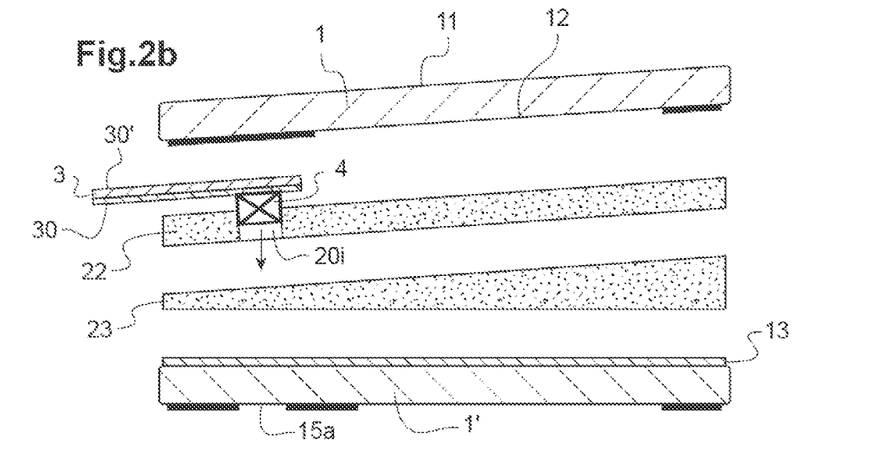

FIG. 2a shows an exploded view of this glazing showing the use of three PVB sheets:

the sheet 22, for example acoustic PVB, with through holes 20a or, in an alternative form, blind holes, the PCB board being against the back face of this sheet, the "back" sheet 21 back face 30' side, which can be optional, the wedge sheet 23 thinner in the bottom region 21a of the windshield than in the top 21b.

Figure 3A:
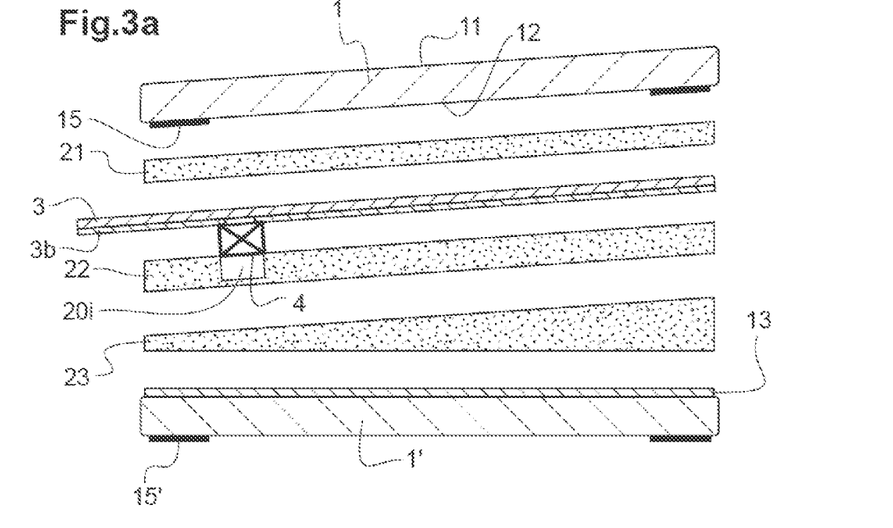
Figure 3B:
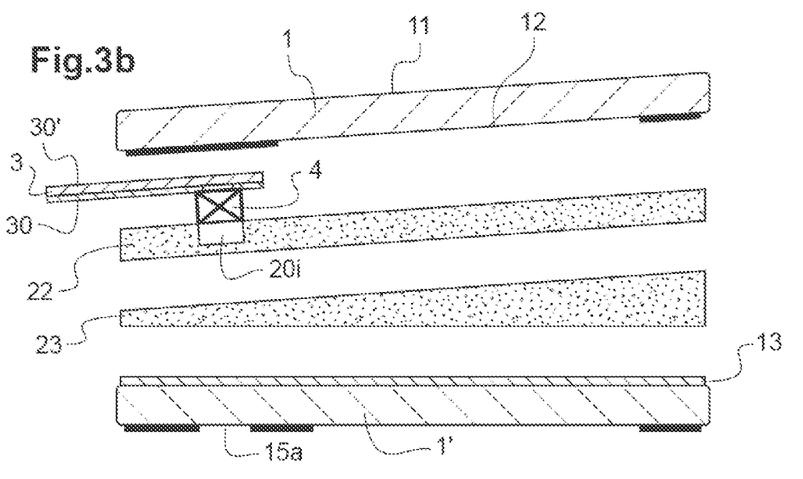

In an alternative form of FIG. 2a, shown in FIG. 3a in exploded view, the diode carrier, for example PET or polyimide, 3 with its conductor 3b covers the windshield (solar control function, and the like); the two PVB sheets 21, 22 are thus in this instance unconnected. If the central sheet 22 is too thick, it is possible, as here, to form a blind hole 20i.

Figure 4A:
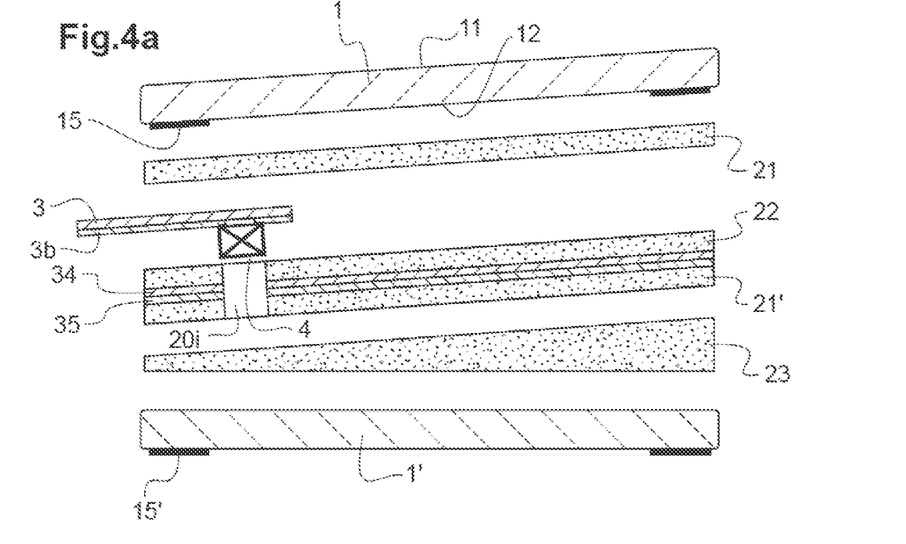

In an alternative form of FIG. 2a, shown in FIG. 4a in exploded view, the sheet with the through apertures is a (preassembled) multilayer sheet, for example PVB 22/PET having a functional layer 34, 35/PVB 21'. The back sheet is optional.

The through aperture 20i can, as shown here, pierce the PET 34 and the electrically conductive layer 35 (in this instance, face F3 side or, in an alternative form, face F2 side).

In an alternative form, the aperture in the PVB 22 is blind and leaves the electrically conductive layer 35 and even the PET 34 intact. The layer can be on the other face of the PET and remain intact.

Figure 5A:
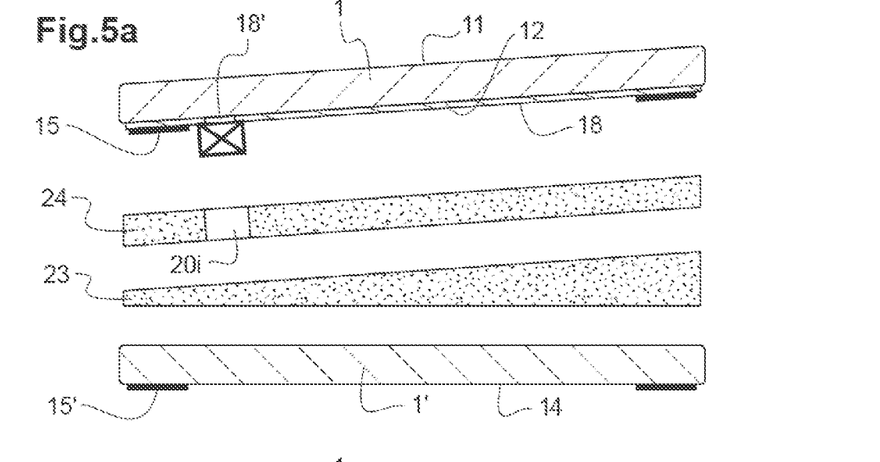

In an alternative form of FIG. 2a shown in FIG. 5a in exploded view:

the back sheet and even the diode carrier are removed, the diodes 4 are surface mount diodes mounted on an insulated 18' electrically conductive (and optionally also solar-control) layer 18 covering the face F2, for example bonded or welded.

Figure 6:
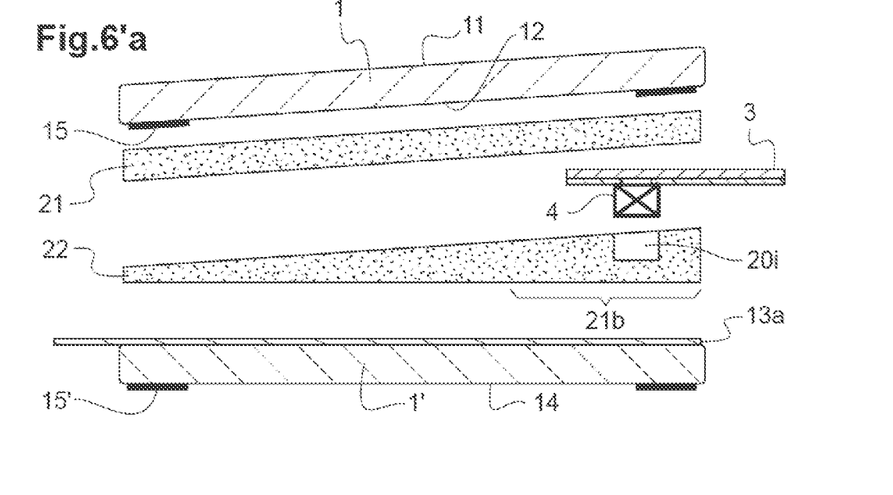
Figure 6A:
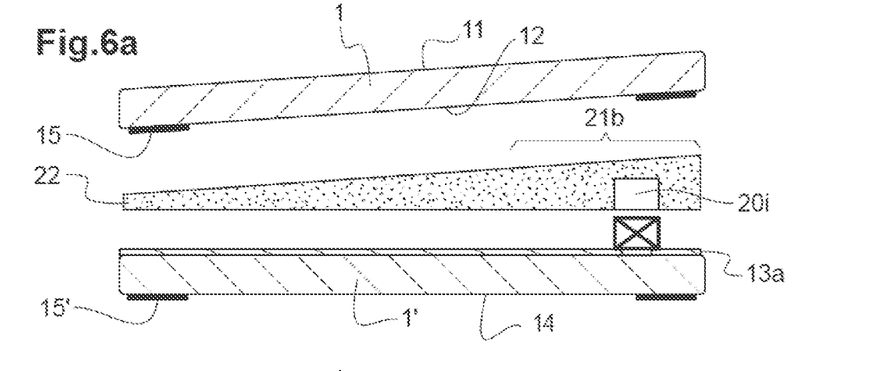
Figure 6B:
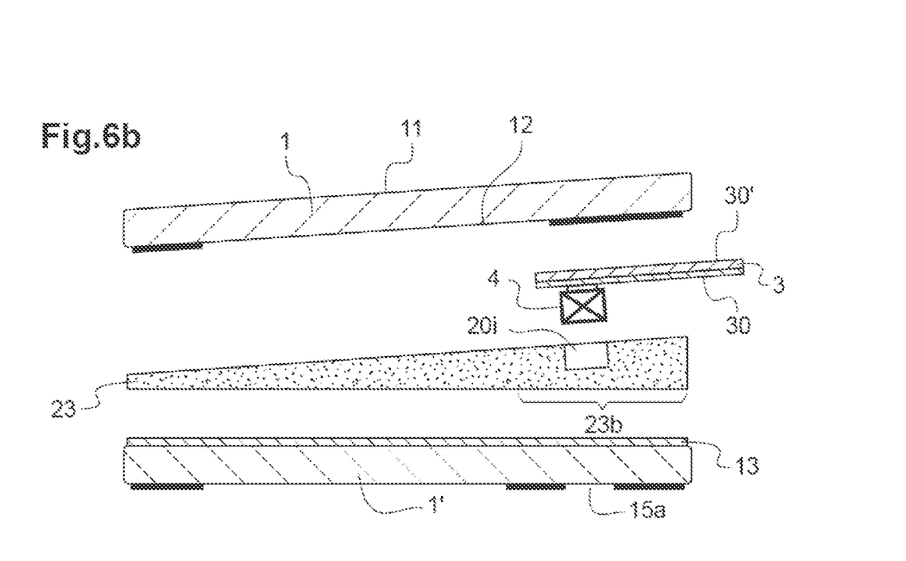

In an alternative form of FIG. 2a shown in FIG. 6a in exploded view:

the back sheet and even the diode carrier are removed, a single wedge sheet (acoustic, and the like) 22 is used and the blind hole 20i, for example in the top region of the windshield (or bottom region, if thick enough), the diodes 4 are surface mount diodes mounted on an insulated 18' electrically conductive (and optionally also solar-control) layer 18 covering the face F3 and are of inverted assembly.

In an alternative form of FIG. 2a shown in FIG. 6'a in exploded view:

the diode carrier is removed, two PVB sheets 21, 22 are used, the wedge sheet (acoustic, and the like) of which carries the blind hole 20i, for example in the top region of the windshield (or bottom region, if thick enough).

In the alternative forms shown in FIG. 2' (assembled view) or in exploded view (FIGS. 2b, 3b, 4b, 5b, 6b):

the back PVB sheet is removed and optionally replaced by a leaktight adhesive on the back face 30', a gap 15a is produced in the enamel layer 15' on face F4 in order to let the light pass from the diode 4, which is more peripheral in this instance.

Figure 5B:
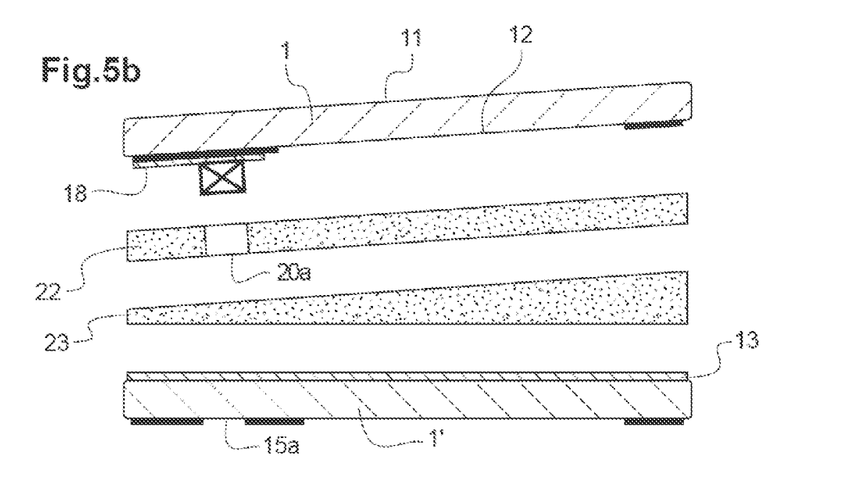

In particular, in an alternative form of FIG. 5a shown in FIG. 5b in exploded view, the electrically conductive (and optionally also solar-control) layer 18, which is, for example, opaque, such as a silver-containing enamel, is on the masking enamel 15.

Figure 4B:
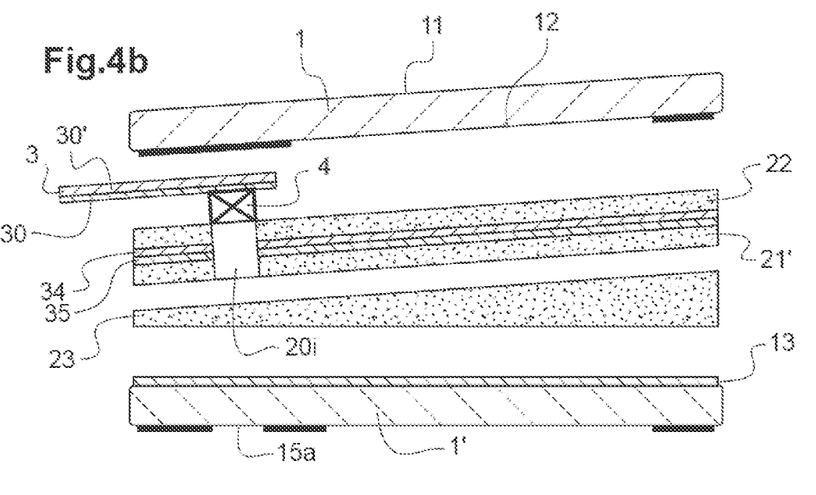

In particular, as in FIG. 4a, in FIG. 4b the sheet with the through apertures is a (preassembled) multilayer sheet, for example PVB 22/PET having a functional layer 34, 35/PVB 21'. The through aperture 20i can, as shown here, pierce the PET 34 and the electrically conductive layer 35 (in this instance, face F3 side or, in an alternative form, face F2 side).

In an alternative form, the aperture in the PVB 22 is blind and leaves the electrically conductive layer 35 and even the PET 34 intact. The layer can be on the other face of the PET and remain intact.

A diode can be of the chip-on-board type or even very preferably a surface mount device (SMD) then comprising a peripheral package.

Figure 7:
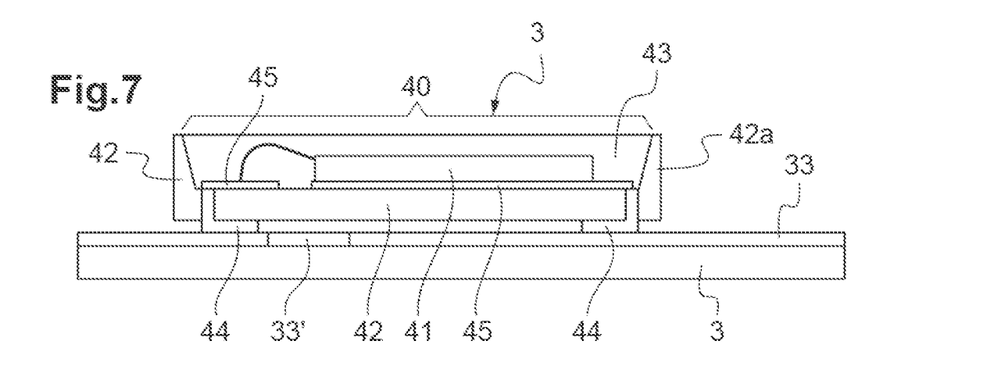
FIG. 7 shows a surface mount diode mounted on a diode carrier.

In a preferred embodiment shown in FIG. 7, each diode is an electronic component including at least one semiconductor chip 41 and is equipped with a polymeric or ceramic peripheral package 42, encapsulating the edge face 42a of the electronic component (and defining the edge face of the diode), surrounding the semiconductor chip.

The package can correspond to the maximum thickness (height) e2 of the diode. The package is, for example, made of epoxy. A polymeric package can optionally shrink (the final thickness after lamination can be less than the initial thickness) during the lamination. The (polymeric) package can be opaque.

The package (which is monolithic or made of two segments) can comprise a part 42 forming a support carrying the chip and a part forming a reflector which widens with distance from the support higher than the chip, and containing a protective resin 43 and/or a material having a color conversion function. The front surface 40 can be defined as the surface of this material covering the chip, this surface being set back from or level with the "front" surface of the reflector.

The diode can comprise a protective resin or a material having a color conversion function, even just on the semiconductor chip. The semiconductor chip can be embedded in a material (resin, and the like).

The anode and cathode contacts 44 are on an insulated 33' layer 33. The contacts are extended by via holes into the support as far as zones of layers 44, the one connected by a wire to the cathode.

The invention claimed is:

1. A vehicle laminated windshield for head-up display, comprising:
   a laminated glazing comprising:
   a first glazing, forming an exterior glazing, with first and second main faces;
   a lamination interlayer made of polymeric material, the lamination interlayer having a cross section which decreases in wedge shape from a top toward a bottom of the laminated glazing;
   a second glazing, forming an interior glazing, with third and fourth main faces,
   the second main face and the third main face being the internal faces of the laminated glazing,
   between the second main face and the third main face, one or more inorganic light-emitting diodes, each inorganic light-emitting diode having an emitting face capable of emitting, in a direction of the third main face, a signaling light, and each inorganic light-emitting diode having an edge face, each inorganic light-emitting diode being of submillimetric thickness,
   for each inorganic light-emitting diode, the lamination interlayer comprises a blind aperture surrounding the edge face of the inorganic light-emitting diode and/or, for a group of inorganic light-emitting diodes, the lamination interlayer comprises a common blind aperture surrounding said group of inorganic light-emitting diodes,
   wherein the lamination interlayer is formed either by a single sheet of polymeric material or by a laminated assembly of at least a first sheet and a second sheet of polymeric material,
   said single sheet having a first main face in which a first cut-out portion is present to form said blind aperture or said common blind aperture,
   said first sheet of polymeric material being of unvarying thickness and said second sheet of polymeric material having a cross-section which decreases in wedge shape from the top toward the bottom of the laminated glazing, said first sheet of polymeric material or said second sheet of polymeric material having a second main face in which a second cut-out portion is present to form said blind aperture or said common blind aperture.

2. The vehicle laminated windshield as claimed in claim 1, wherein a remaining thickness between a bottom of the blind aperture and the opposite face is at least 0.1 mm.

3. The vehicle laminated windshield as claimed in claim 1, wherein walls of a blind aperture of the lamination interlayer are spaced out by at most 0.5 mm from the edge face of the inorganic light-emitting diode and/or the walls of a common blind aperture of the lamination interlayer are spaced out by at most 0.5 mm from the group of inorganic light-emitting diodes.

4. The vehicle laminated windshield as claimed in claim 1, wherein the lamination interlayer comprises a poly(vinyl butyral) (PVB), or a composite PVB/plastic film or PVB/plastic film/PVB element.

5. The vehicle laminated windshield as claimed in claim 1, wherein the lamination interlayer comprises a composite PVB/plastic film or PVB/plastic film/PVB element, the plastic film carrying a functional layer.

6. The vehicle laminated windshield as claimed in claim 1, wherein the lamination interlayer comprises a PVB with a thickness ranging from 0.5 to 0.9 mm, the inorganic light-emitting diodes are surface mount devices mounted on a front face of a diode carrier of thickness of at most 0.15 mm.

7. The vehicle laminated windshield as claimed in claim 1, wherein the inorganic light-emitting diode or diodes are surface mount devices mounted on a diode carrier.

8. The vehicle laminated windshield as claimed in claim 1, wherein the inorganic light-emitting diode or diodes are surface mount devices mounted on a diode carrier, and a lamination interlayer is also between a back face of the diode carrier and the second main face.

9. The vehicle laminated windshield as claimed in claim 1, wherein the inorganic light-emitting diode or diodes are in a bottom part of the windshield.

10. The vehicle laminated windshield as claimed in claim 1, wherein the inorganic light-emitting diode or diodes are surface mount devices mounted on a diode carrier a back face of which is mounted on the second main face, and the inorganic light-emitting diode or diodes are positioned in a region of the windshield in which the exterior glazing is rendered opaque by an opaque layer, and/or in which the interior glazing is rendered opaque by an opaque layer, and then comprising at least one gap in line with the inorganic light-emitting diodes.

11. The vehicle laminated windshield as claimed in claim 1, wherein the luminous signaling by the inorganic light-emitting diode or diodes is an anti-collision system and/or the or one of the inorganic light-emitting diodes is a luminous indicator of a touch on/off switch between the second main face and the third main face or on the fourth main face.

12. A vehicle comprising at least one laminated windshield as claimed in claim 1.

13. A process for the manufacture of the laminated windshield for head-up display, the laminated windshield including
a laminated glazing comprising:
a first glazing, forming an exterior glazing, with first and second main faces;
a lamination interlayer made of polymeric material, the lamination interlayer having a cross section which decreases in wedge shape from a top toward a bottom of the laminated glazing;
a second glazing, forming an interior glazing, with third and fourth main faces,
the second main face and the third main face being the internal faces of the laminated glazing,
between the second main face and the third main face, one or more inorganic light-emitting diodes, each inorganic light-emitting diode having an emitting face capable of emitting, in a direction of the third main face, a signaling light, and each inorganic light-emitting diode having an edge face, each inorganic light-emitting diode being of submillimetric thickness,
for each inorganic light-emitting diode, the lamination interlayer comprises a blind aperture surrounding the edge face of the inorganic light-emitting diode and/or, for a group of inorganic light-emitting diodes, the lamination interlayer comprises a common blind aperture surrounding said group of inorganic light-emitting diodes, the method comprising:
cutting out of a first sheet of lamination interlayer of unvarying thickness in order to form one or more local apertures;
providing a second sheet of lamination interlayer having a cross section decreasing in wedge shape from the top toward the bottom of the laminated glazing; and
assembling the laminated glazing.

14. The process for the manufacture of a laminated windshield as claimed in claim 13, wherein, before the assembling, the inorganic light-emitting diode or diodes are in through apertures of the first interlayer sheet.

15. A process for the manufacture of a laminated windshield for a head-up display, the laminated windshield including
a laminated glazing comprising:
a first glazing, forming an exterior glazing, with first and second main faces;
a lamination interlayer made of polymeric material, the lamination interlayer having a cross section which decreases in wedge shape from a top toward a bottom of the laminated glazing;
a second glazing, forming an interior glazing, with third and fourth main faces,
the second main face and the third main face being the internal faces of the laminated glazing,
between the second main face and the third main face, one or more inorganic light-emitting diodes, each inorganic light-emitting diode having an emitting face capable of emitting, in a direction of the third main face, a signaling light, and each inorganic light-emitting diode having an edge face, each inorganic light-emitting diode being of submillimetric thickness,
for each inorganic light-emitting diode, the lamination interlayer comprises a blind aperture surrounding the edge face of the inorganic light-emitting diode and/or, for a group of inorganic light-emitting diodes, the lamination interlayer comprises a common blind aperture surrounding said group of inorganic light-emitting diodes, the method comprising:
cutting out of a first interlayer sheet having a cross section which decreases in wedge shape from the top toward the bottom of the laminated glazing in order to form one or more blind apertures, and
assembling the laminated glazing.

16. The process for the manufacture of the laminated windshield as claimed in claim 13, wherein the first sheet is optionally acoustic and/or tinted or preassembled PVB/functional plastic film with an optional electrically conductive layer, or PVB/functional plastic film with an optional electrically conductive layer/PVB; the optional second sheet is clear or extra-clear.

17. The process for the manufacture of the laminated windshield as claimed in claim 16, wherein the first sheet is a preassembled PVB/plastic film comprising an electrically conductive layer/PVB multisheet, and the blind aperture or apertures are produced in one of the PVBs without reaching the electrically conductive layer.

18. The process for the manufacture of a laminated windshield as claimed in claim 13, wherein the inorganic light-emitting diode or diodes are surface mount devices mounted on a diode carrier.

19. The process for the manufacture of the laminated windshield as claimed in claim 18, wherein the diode carrier protrudes from the edge face of the laminated glazing.

20. The vehicle laminated windshield as claimed in claim 2, wherein the one or more inorganic light-emitting diodes is/are in contact with the bottom of the blind aperture or spaced out from the bottom by at most 0.2 mm.

* * * * *